United States Patent [19]

Nickerson

[11] Patent Number: 5,764,787

[45] Date of Patent: Jun. 9, 1998

[54] MULTI-BYTE PROCESSING OF BYTE-BASED IMAGE DATA

[75] Inventor: Brian R. Nickerson, Aloha, Oreg.

[73] Assignee: Intel Corporation, Santa Clara, Calif.

[21] Appl. No.: 624,904

[22] Filed: Mar. 27, 1996

[51] Int. Cl.[6] ............................................. G06T 7/20
[52] U.S. Cl. ................. 382/107; 382/236; 382/304
[58] Field of Search ................................. 382/107, 236, 382/232, 304; 348/415, 416

[56] References Cited

U.S. PATENT DOCUMENTS

| | | | |
|---|---|---|---|
| 4,775,952 | 10/1988 | Danielson et al. | 364/736 |
| 4,972,495 | 11/1990 | Blike et al. | 382/304 |
| 5,253,308 | 10/1993 | Johnson | 382/304 |
| 5,475,856 | 12/1995 | Kogge | 395/800 |
| 5,493,514 | 2/1996 | Keith et al. | 364/514 R |
| 5,535,288 | 7/1996 | Chen et al. | 382/236 |
| 5,566,250 | 10/1996 | Coelho | 382/276 |
| 5,625,713 | 4/1997 | Allen et al. | 382/232 |

OTHER PUBLICATIONS

Liu et al. "New Fast Algorithms for the Estimation of Block Motion Vectors." IEEE Transactions on Circuits and Systems for Video Technology, vol. 3, No. 2, pp. 148–157, Apr. 1993.

Wu et al. "A VLSI Motion Estimator for Video Image Compression." IEEE Transactions on Consumer Electronics, vol. 39, No. 4, pp. 837–846, Jun. 1993.

Toyokura et al. "A Video DSP with a Macroblock–Level–Pipeline and a SIMD Type Vector–Pipeline Architecture for MPEG2 CODEC." IEEE Journal of Solid–State Circuits, vol. 29, No. 12, pp. 1474–1481, Dec. 1994.

*Primary Examiner*—Jon Chang
*Attorney, Agent, or Firm*—Duane, Morris & Heckscher LLP

[57] ABSTRACT

Consecutive pixel values are loaded into the fields of a register. The data stored in the register is then transformed by operating on the register with one or more instructions that treat multiple pixel values as if they were single values. In a preferred embodiment, subsampled motion estimation processing is implemented on SIMD architecture. Values for consecutive pixels are loaded into the 8-bit fields of a SIMD register with a single byte-based SIMD load instruction. The contents of the register are then processed by applying one or more word-based SIMD instructions to the register which treat the data in the registers as 16-bit values. This word-based processing preferably results in sums of squares of differences between reference and target pixels used in motion estimation processing. Although the byte-based SIMD load instruction loads unwanted pixels (i.e., those pixels not selected for subsampled motion estimation processing) along with the desired pixels, the subsequent word-based SIMD processing treats the unwanted pixels as low-order bits of the desired pixels. The squares of differences may have errors, but the magnitudes of the errors are insignificant compared to the overall block comparison values and, as such, produce negligible if any affect on the selection of reference blocks during motion estimation processing.

6 Claims, 5 Drawing Sheets

COLUMNS

|   | 0 | 1 | 2 | 3 | 4 | 5 | 6 | 7 |
|---|---|---|---|---|---|---|---|---|
| 0 | X |   | X |   | X |   | X |   |
| 1 |   | X |   | X |   | X |   | X |
| 2 | X |   | X |   | X |   | X |   |
| 3 |   | X |   | X |   | X |   | X |
| 4 | X |   | X |   | X |   | X |   |
| 5 |   | X |   | X |   | X |   | X |
| 6 | X |   | X |   | X |   | X |   |
| 7 |   | X |   | X |   | X |   | X |

ROWS

MULTI-BYTE PROCESSING OF BYTE-BASED IMAGE DATA

BACKGROUND OF THE INVENTION

1. Field of the Invention

The present invention relates to image processing, and in particular, to motion estimation processing for video compression.

2. Description of the Related Art

In video compression, temporal redundancy between successive video frames is often exploited to reduce the number of bits used to represent the video data. Motion estimation is the process of identifying regions (typically squares of pixel data) of a reference frame that most closely match regions of a current frame. The current frame can then be encoded in terms of the differences between the blocks of the current frame and the associated motion-compensated blocks of the reference frame.

During motion estimation, a block of the current frame is compared with different blocks of the reference frame, one block at a time. Each comparison involves a computation based on some or all of the pixels of the two blocks. The computation may involve, for example, the generation of a sum of squares of the differences (SSD) between corresponding pixels or the sum of the absolute differences (SAD) between the corresponding pixels. Motion estimation may be based on subsampled block comparisons in which only a subset of the pixels of each block are compared to the corresponding pixels of each reference block. Motion estimation may also be based on bi-directional prediction in which block comparisons are based on reference blocks from both a past reference frame and a future reference frame. The computational load for motion estimation depends on the type of prediction, the number of blocks per frame, the number of reference block comparisons for each block, the number of pixels per block comparison, and the type of computation involved in each block comparison. In general, motion estimation typically imposes a relatively heavy processing load on a video encoding system.

To meet that processing demand, in traditional video processing systems, motion estimation has been implemented on specially designed digital signal processors (DSPs) such as application specific integrated circuits (ASICs) that are specifically designed to perform and handle the heavy computational load of motion estimation. One recent trend is to move more and more of the video processing traditionally implemented on DSPs to general-purpose processors. Since such general-purpose processors will typically be performing functions other than video processing, it is important to provide efficient algorithms for performing computationally intense operations such as motion estimation.

Further objects and advantages of this invention will become apparent from the detailed description of a preferred embodiment which follows.

SUMMARY OF THE INVENTION

The present invention comprises a computer-implemented process, an apparatus, and a storage medium encoded with machine-readable computer program code for processing image signals. According to a preferred embodiment, values for two or more consecutive pixels are loaded into two or more fields of a register using a first operation. The pixels are transformed by applying a second operation to the register, wherein the second operation operates on the register as if two or more of the pixel values were a single value.

BRIEF DESCRIPTION OF THE DRAWINGS

Other objects, features, and advantages of the present invention will become more fully apparent from the following detailed description of the preferred embodiment, the appended claims, and the accompanying drawings in which:

FIG. 3 is a representation of an (8×8) block of a current video frame for which motion estimation is to be performed;

DESCRIPTION OF THE PREFERRED EMBODIMENT(S)

The present invention is related to video processing on single-instruction, multiple-data (SIMD) parallel processor architectures. In SIMD architectures, a two or more data values are loaded into two or more registers. The processor then executes a single instruction which applies a corresponding operation to each of the data values in each of the registers independently but at the same time. The present invention is directed to the implementation of motion estimation on such SIMD architectures. In a preferred embodiment, word-based SIMD instructions are applied to byte-based data, thereby treating pairs of byte-based values as if they were single 16-bit values. The present invention increases the efficiency of subsampled motion estimation processing by using (1) byte-based SIMD instructions to load consecutive pixels into SIMD registers and (2) word-based SIMD instructions to treat unwanted pixels (i.e., those not selected for subsampled motion estimation processing) as if they were the low-order bits of the desired pixels.

System Hardware Architectures

Figure 1:
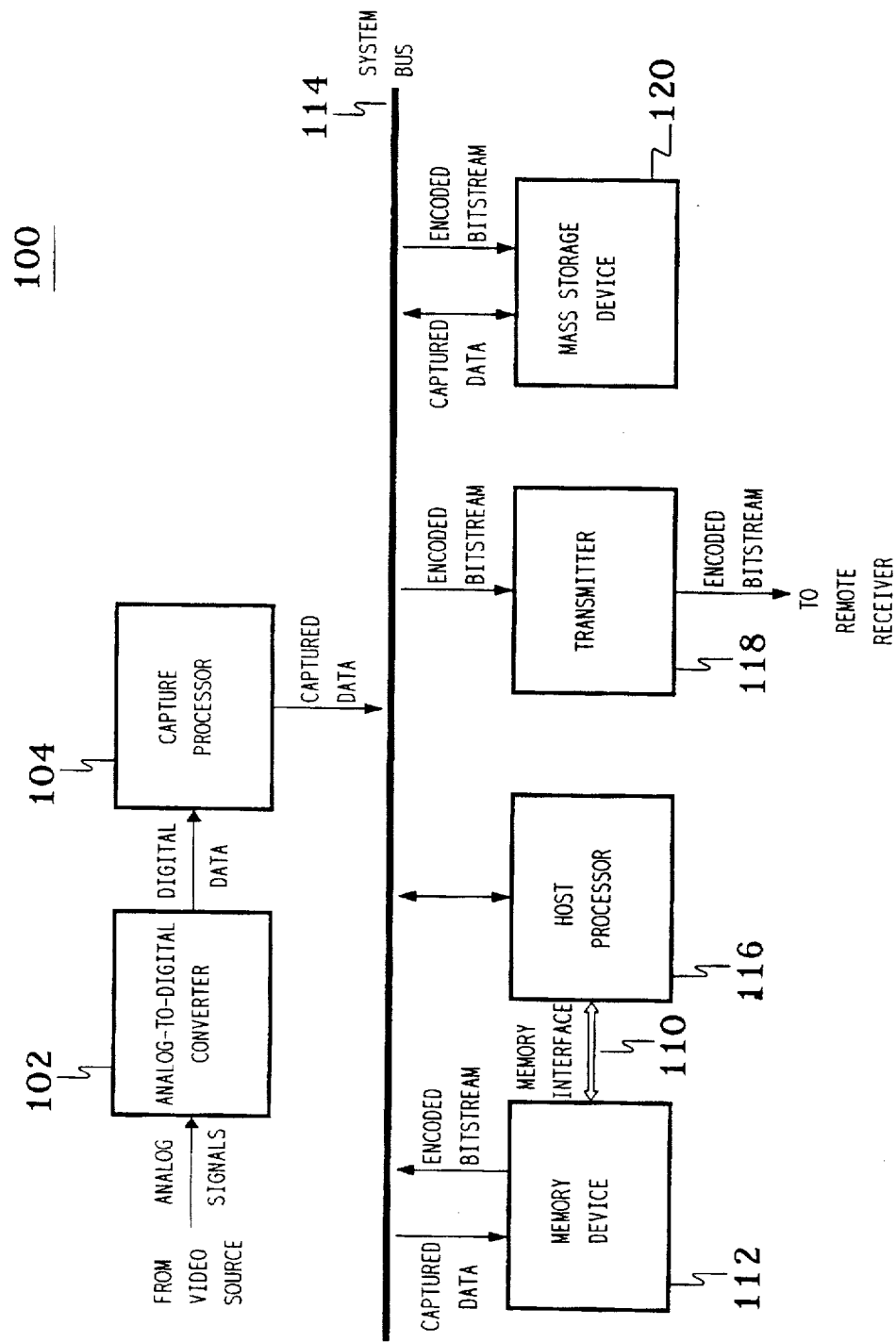
FIG. 1 is a block diagram of a video system for encoding video signals in a PC environment, according to a preferred embodiment of the present invention.

Referring now to FIG. 1, there is shown a computer system 100 for encoding video signals, according to a preferred embodiment of the present invention. Analog-to-digital (A/D) converter 102 of encoding system 100 receives analog video signals from a video source. The video source may be any suitable source of analog video signals such as a video camera or VCR for generating local analog video signals or a video cable or antenna for receiving analog video signals from a remote source. A/D converter 102 separates the analog video signal into constituent components and digitizes the analog components into digital video component data (e.g., in one embodiment, 24-bit RGB component data).

Capture processor 104 captures the digital 3-component video data received from converter 102. Capturing may include one or more of color conversion (e.g., RGB to YUV), scaling, and subsampling. Each captured video frame is represented by a set of three two-dimensional component planes, one for each component of the digital video data. In one embodiment, capture processor 104 captures video data in a YUV9 (i.e., YUV 4:1:1) format, in which every (4×4)

block of pixels of the Y-component plane corresponds to a single pixel in the U-component plane and a single pixel in the V-component plane. Capture processor 104 selectively stores the captured data to memory device 112 and/or mass storage device 120 via system bus 114. Those skilled in the art will understand that, for real-time encoding, the captured data are preferably stored to memory device 112, while for non-real-time encoding, the captured data are preferably stored to mass storage device 120. For non-real-time encoding, the captured data will subsequently be retrieved from mass storage device 120 and stored in memory device 112 for encode processing by host processor 116.

During encoding, host processor 116 reads the captured bitmaps from memory device 112 via high-speed memory interface 110 and generates an encoded video bitstream that represents the captured video data and conforms to the H.263 standard. The resulting encoded video bitstream is then stored to memory device 112 via memory interface 110. Host processor 116 may copy the encoded video bitstream to mass storage device 120 for future playback and/or transmit the encoded video bitstream to transmitter 118 for real-time transmission to a remote receiver (not shown in FIG. 1).

Figure 2:
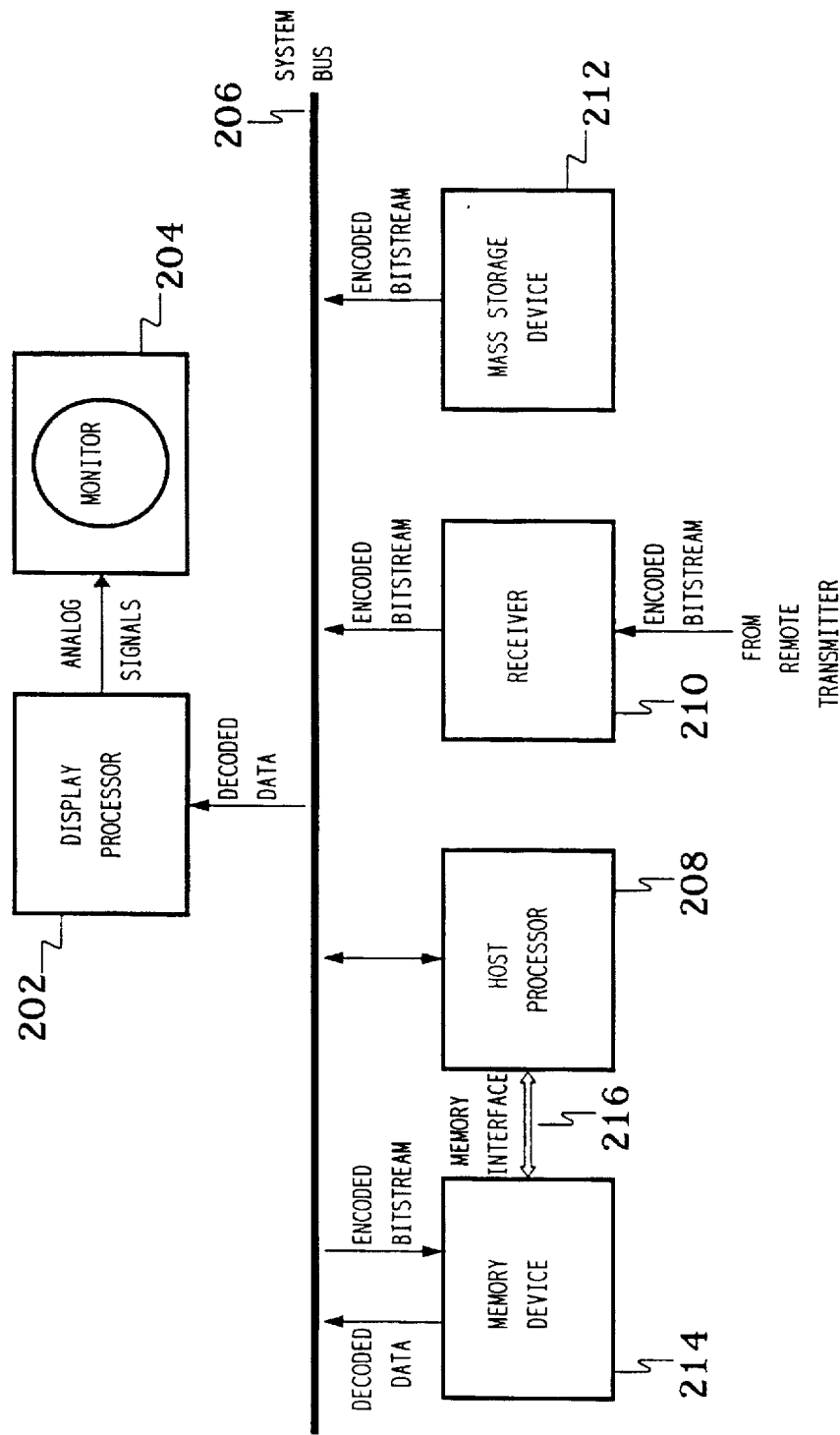
FIG. 2 is a computer system for decoding the video signals encoded by the computer system of FIG. 1, according to a preferred embodiment of the present invention.

Referring now to FIG. 2, there is shown a computer system 200 for decoding the encoded H.263 video bitstream encoded by encoding system 100 of FIG. 1, according to a preferred embodiment of the present invention. The encoded video bitstream is either read from mass storage device 212 of decoding system 200 or received by receiver 210 from a remote transmitter, such as transmitter 118 of FIG. 1. The encoded video bitstream is stored to memory device 214 via system bus 206.

Host processor 208 accesses the encoded video bitstream stored in memory device 214 via high-speed memory interface 216 and decodes the encoded video bitstream for display. Decoding the encoded video bitstream involves undoing the compression processing implemented by encoding system 100 of FIG. 1. Host processor 208 stores the resulting decoded video data to memory device 214 via memory interface 216 from where the decoded video data are transmitted to display processor 202 via system bus 206. Alternatively, host processor 208 transmits the decoded video data directly to display processor 202 via system bus 206. Display processor 202 processes the decoded video data for display on monitor 204. The processing of display processor 202 includes digital-to-analog conversion of the decoded video data. After being decoded by host processor 208 but before being D/A converted by display processor 202, the decoded video data may be upsampled (e.g., from YUV9 to YUV24), scaled, and/or color converted (e.g., from YUV24 to RGB24). Depending upon the particular embodiment, each of these processing steps may be implemented by either host processor 208 or display processor 202.

Referring again to FIG. 1, encoding system 100 is preferably a microprocessor-based personal computer (PC) system with a special purpose video-processing plug-in board. In particular, A/D converter 102 may be any suitable means for decoding and digitizing analog video signals. Capture processor 104 may be any suitable processor for capturing digital video component data as subsampled frames. In a preferred embodiment, A/D converter 102 and capture processor 104 are contained in a single plug-in board capable of being added to a microprocessor-based PC system.

Host processor 116 may be any suitable means for controlling the operations of the special-purpose video processing board and for performing video encoding, including motion estimation processing. Host processor 116 is preferably a general-purpose microprocessor having SIMD processing capabilities. System bus 114 may be any suitable digital signal transfer device and is preferably a peripheral component interconnect (PCI) bus. Memory device 112 may be any suitable computer memory device and is preferably one or more dynamic random access memory (DRAM) devices. High-speed memory interface 110 may be any suitable means for interfacing between memory device 112 and host processor 116. Mass storage device 120 may be any suitable means for storing digital data and is preferably a computer hard drive. Transmitter 118 may be any suitable means for transmitting digital data to a remote receiver. Those skilled in the art will understand that the encoded video bitstream may be transmitted using any suitable means of transmission such as telephone line, RF antenna, local area network, or wide area network.

Referring again to FIG. 2, decoding system 200 is preferably a microprocessor-based PC system similar to the basic PC system of encoding system 100. In particular, host processor 208 may be any suitable means for decoding an encoded video bitstream and is preferably a general-purpose microprocessor manufactured by Intel Corporation, such as an i486™, Pentium®, or Pentium® Pro processor. Alternatively, host processor 208 may be a processor having SIMD processing capabilities. System bus 206 may be any suitable digital data transfer device and is preferably a PCI bus. Mass storage device 212 may be any suitable means for storing digital data and is preferably a CD-ROM device or a hard drive. Receiver 210 may be any suitable means for receiving the digital data transmitted by transmitter 118 of encoding system 100. Display processor 202 and monitor 204 may be any suitable devices for processing and displaying video images (including the conversion of digital video data to analog video signals) and are preferably parts of a PC-based display system having a PCI graphics board and a 24-bit RGB monitor.

In a preferred embodiment, encoding system 100 of FIG. 1 and decoding system 200 of FIG. 2 are two distinct computer systems. In an alternative preferred embodiment of the present invention, a single computer system comprising all of the different components of systems 100 and 200 may be used to encode and decode video images. Those skilled in the art will understand that such a combined system may be used to display decoded video images in real-time to monitor the capture and encoding of video stream.

In alternative embodiments of present invention, the video encode processing of an encoding system and/or the video decode processing of a decoding system may be assisted by a pixel processor or other suitable component(s) to off-load processing from the host processor by performing computationally intensive operations. Such a pixel processor preferably provides SIMD processing capabilities.

Motion Estimation Processing

Referring now to FIG. 3, there is shown a representation of an (8×8) block 300 of a current video frame for which motion estimation is to be performed. According to a preferred embodiment of the present invention, the motion estimation processing involves subsampled block comparisons. That is, when block 300 is compared to a block of the corresponding reference frame, the pixel-to-pixel mathematical computations (e.g., SAD or SSD) are based on less than all of the pixels of each block. FIG. 3 shows a particular "checkerboard" subsampling pattern, where only those pixels marked with an "X" are used for the block comparisons. Since only half of the block pixels are used in each block comparison, the computational load is lower than for a motion estimation scheme that uses all of the pixels. Typically, a subsampled motion estimation scheme still uses enough pixels to ensure sufficiently accurate results.

Since the subsampled motion estimation scheme of FIG. 3 uses only every other pixel of each row, one way to implement the block comparisons would be to load only those pixels marked with an "X" into the registers during block-comparison processing. On typical SIMD architectures, this would require each pixel to be loaded into its own register individually. This would be less than optimally efficient on many SIMD architectures which provide a SIMD data-load instruction which loads multiple contiguous data values into a set of parallel registers with a single SIMD instruction. Those skilled in the art will understand that few if any SIMD processors provide a SIMD instruction for loading every other data value.

The problem with using the SIMD data-load instruction for subsampled motion estimation processing is that it loads unwanted pixels along with the desired pixels (i.e., those marked with an "X" in FIG. 3) into the parallel registers. The present invention is directed to schemes for performing subsampled motion estimation processing efficiently on SIMD architectures. The present invention takes advantage of efficient SIMD instructions for operations such as data loading without being unreasonably affected by the inclusion of unwanted pixels.

Figure 4:
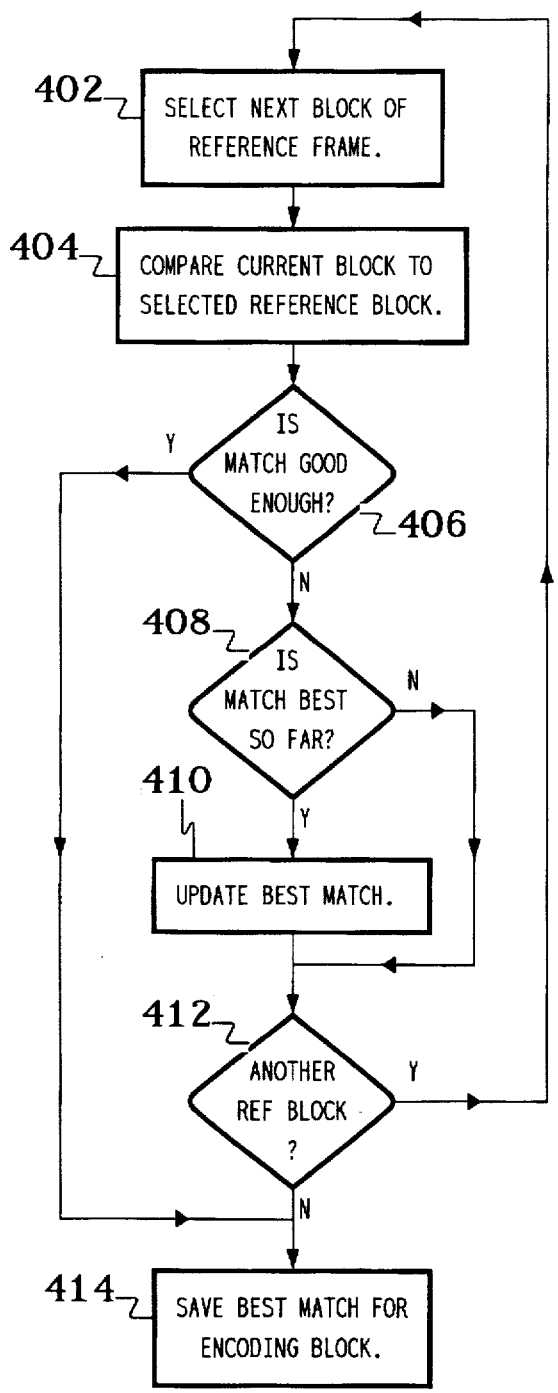
FIG. 4 is a flow diagram of the subsampled motion estimation processing implemented by the host processor of the encoding system of FIG. 1.

Referring now to FIG. 4, there is shown a flow diagram of the subsampled motion estimation processing implemented by host processor 116 of encoding system 100 of FIG. 1, according to a preferred embodiment of the present invention. FIG. 4 shows the steps involved in finding the block in the reference frame that best matches a current block of the current frame to be encoded. The processing of FIG. 4 is implemented once for each of the blocks of the current frame.

In particular, steps 402 and 412 of FIG. 4 control the selection of the different blocks of the reference frame for the block comparisons with the current block of the current frame. Those skilled in the art will understand that this block selection can follow any appropriate scheme such as exhaustive searching or logarithm searching.

After each block of the reference frame is selected, it is compared to the current block of the current frame (step 404). In subsampled motion-estimation, a block comparison involves the generation of a value that represents the degree to which the two blocks are similar. The value may be, for example, a sum of squares of differences (SSD) or a sum of absolute differences (SAD). The processing of step 404 is described in further detail later in this specification in the section entitled "Subsampled Block Comparison."

If the current match is good enough (step 406) (i.e., if the block comparison value is less than a specified threshold), then motion estimation processing continues to step 414 where the selected reference block is saved as the best match for subsequent inter-frame difference encoding of the current block of the current frame.

Otherwise, processing continues to step 408 where it is determined whether the selected reference block is the best match so far (e.g., has the smallest SSD or SAD value of all previous reference blocks for the current block). If the selected reference block is the best match so far, then it is saved as such (step 410). Processing then continues to step 412 to determine whether another reference block is to be selected (in which case processing returns to step 402) or whether reference-block selection is complete (in which case processing continues to step 414).

Subsampled Block Comparison

Figure 5:
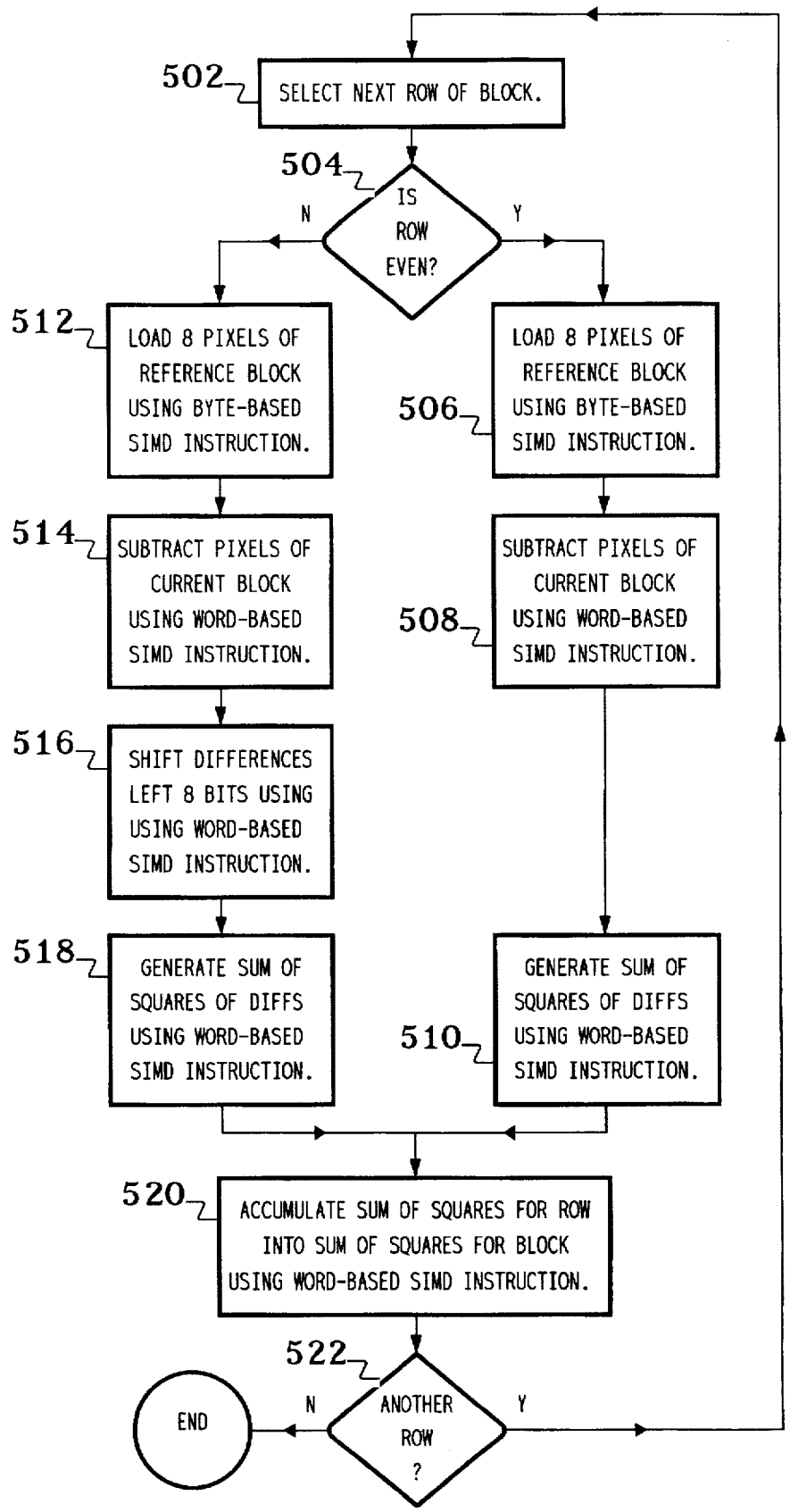
FIG. 5 is a flow diagram of the subsampled block comparison processing implemented by the host processor of the encoding system of FIG. 1 for the (8×8) block of FIG. 3.

Referring now to FIG. 5, there is shown a flow diagram of the subsampled block comparison processing implemented by host processor 116 of encoding system 100 of FIG. 1 for an (8×8) block such as block 300 of FIG. 3, according to a preferred embodiment of the present invention. The processing of FIG. 5 corresponds to step 404 of FIG. 4 and is implemented once for each block comparison.

Steps 502 and 522 control the sequential selection of rows 0 through 7 of block 300 of FIG. 3. If the currently selected row is an even row (i.e., row 0, 2, 4, or 6) (step 504), then processing continues to steps 506–510. Otherwise, the selected row is an odd row (i.e., row 1, 3, 5, or 7) and processing continues to steps 512–518. Steps 506–510 may be represented by the following three SIMD instructions:

| movq | mm0,Reference | Step 506. |
| psubw | mm0,Target | Step 508. |
| pmaddwd | mm0,mm0 | Step 510. |

The SIMD instructions are defined as follows:

| movq | A byte-based (i.e., 8-bit) SIMD instruction that, in this case, moves eight consecutive 7-bit pixels from the reference block into the eight 8-bit fields of register mm0. |
| psubw | A word-based (i.e., 16-bit) SIMD instruction that, in this case, subtracts eight consecutive 7-bit pixels from the current (i.e., target) block (treated as four 16-bit values) from the eight 7-bit values in register mm0 (also treated as four 16-bit values) and stores four 16-bit differences into register mm0. |
| pmaddwd | A word-based SIMD instruction that, in this case, squares each of the four 16-bit values in register mm0, stores the sum of the lower two squares (i.e., from mm0[0:15] and mm0[16:31] into mm0[0:31]; and stores the sum of the higher two squares (i.e., from mm0[32:47] and mm0[48:63] into mm0[32:63]. |

Similarly, steps 512–518 may be represented by the following four SIMD instructions:

| movq | mm0,Reference | Step 512. |
| psubw | mm0,Target | Step 514. |
| psllw | mm0,8 | Step 516. |
| pmaddwd | mm0,mm0 | Step 518. |

The SIMD instruction psllw is defined as follows:

| psllw | A word-based SIMD instruction that, in this case, shifts each of the four 16-bit values in register mm0 left 8 bits. |

In either case (i.e., even or odd row), processing continues to step 520, which may be represented by the following SIMD instruction:

| paddusw | mm7,mm0 | Step 520. |

The SIMD instruction paddusw is defined as follows:

| paddusw | A word-based SIMD saturating-add instruction that, in this case, adds each of the four 16-bit values in register mm0 to the corresponding 16-bit values in register mm7. |

At the completion of processing (i.e., after row 7 has been processed), the total comparison value for the block can be generated by summing together the two 16-bit values in register mm7 in bits 16 thru 31 and 48 thru 63.

The subsampled block comparison of the present invention is based on the application of word-based operations on byte-based data. In the embodiment of FIG. 5, data for multiple consecutive pixels (preferably 7-bit pixels) are loaded into the 8-bit fields of a SIMD register using a byte-based SIMD load instruction. The data are then processed using word-based SIMD instructions that treat the byte-based data as if they were word-based data.

Using the byte-based SIMD instruction to load pixel data takes advantage of the efficiencies of the SIMD load instruction (versus loading each pixel separately). Doing so, however, loads data for unwanted pixels along with the data for the desired pixels. For even rows, using the word-based SIMD instructions to process the loaded data effectively solves that problem by treating the unwanted pixel data as low-order bits of the desired pixel data. For odd rows, the problem is solved by shifting the unwanted pixel data off the left end or high-order end of the 16-bit fields and at the same time shifting the desired pixel data into the high-order bits to ensure that the data for the even and odd rows are scaled the same. Although this scheme may introduce some degree of error into the resulting block comparison values, as the following examples show, the error is negligible and its effect on motion estimation processing is insignificant.

Two 16-bit fields RX and TX corresponding, respectively, to 16 bits of reference data and 16 bits of target data are represented as follows:

$$RX=[RH|RL] \ TX=[TH|TL]$$

The 16-bit field RX contains 8-bit high-order field RH and 8-bit low-order field RL. Similarly, the 16-bit field TX contains 8-bit high-order field TH and 8-bit low-order field TL. The 16-bit values RX and TX are related to the 8-bit values RH, RL, TH, and TL as follows:

$$RX=RL+256*RH$$

$$TX=TL+256*TH$$

The following examples show the errors that will result in the square of the differences between reference and target values from using the preferred embodiment of the present invention as compared to the exact values.

Example 1:

| | |
|---|---|
| RH | = 0 |
| RL | = 0 |
| TH | = 0 |
| TL | = 0 |
| ((RH-TH)^2) | = 0 |
| ((RX-TX)^2)/256^2) | = 0 |
| Error | = 0 |

Example 2:

| | |
|---|---|
| RH | = 127 |
| RL | = 0 |
| TH | = 0 |
| TL | = 0 |
| ((RH-TH)^2) | = 16129 |
| ((RX-TX)^2)/256^2) | = 16129 |
| Error | = 0 |

Example 3:

| | |
|---|---|
| RH | = 0 |
| RL | = 127 |
| TH | = 0 |
| TL | = 0 |

-continued

| | |
|---|---|
| ((RH-TH)^2) | = 0 |
| ((RX-TX)^2)/256^2) | = 0.24611 |
| Error | = 0.24611 |

Example 4:

| | |
|---|---|
| RH | = 127 |
| RL | = 0 |
| TH | = 0 |
| TL | = 127 |
| ((RH-TH)^2) | = 16129 |
| ((RX-TX)^2)/256^2) | = 16003.24 |
| Error | = 125.76 |

Example 5:

| | |
|---|---|
| RH | = 0 |
| RL | = 127 |
| TH | = 127 |
| TL | = 0 |
| ((RH-TH)^2) | = 16129 |
| ((RX-TX)^2)/256^2) | = 16003.24 |
| Error | = 125.76 |

Example 6:

| | |
|---|---|
| RH | = 60 |
| RL | = 75 |
| TH | = 62 |
| TL | = 64 |
| ((RH-TH)^2) | = 4 |
| ((RX-TX)^2)/256^2) | = 3.83 |
| Error | = 0.17 |

Example 7:

| | |
|---|---|
| RH | = 60 |
| RL | = 64 |
| TH | = 62 |
| TL | = 75 |
| ((RH-TH)^2) | = 4 |
| ((RX-TX)^2)/256^2) | = 4.17 |
| Error | = 0.17 |

Those skilled in the art will appreciate that the errors shown in these examples are small when compared to the total block comparison values used to evaluate the closeness of the match between the reference and target blocks. That is, although the present invention introduces errors into the block comparison calculations, ultimately these errors will rarely if ever adversely affect the selection of which block of the reference frame to use to encode the current target block of the current frame.

Those skilled in the art will understand that, in order to increase processing speed, the conditional tests of steps 504 and 522 as well as step 502 of FIG. 5 may be eliminated by loop unrolling the code (i.e., explicitly coding each of the processing paths). Although doing so increases the size of the code, it can also greatly increase the speed of the processing.

The processing of FIG. 5 and the associated SIMD instructions correspond to a processor having a particular instruction set that includes those particular SIMD instructions. Those skilled in the art will understand that the present invention may be implemented differently on other processors having different instruction sets.

In the preferred embodiment described earlier in this specification, the present invention was described in the context of motion estimation processing for video encoding based on (8×8) blocks. Those skilled in the art will understand that the motion estimation processing of the present invention may be based on blocks of sizes other than (8×8) (e.g., (16×16) macroblocks). For (16×16) macroblocks, the processing of FIG. 5 may be implemented twice for each row using a 64-bit SIMD register to process all 16 pixels. It will also be understood that alternative embodiments of the present invention may be directed to motion estimation for purposes other than video encoding (e.g., computer vision). It will be further understood that still other embodiments of the present invention may be directed to pixel processing other than for motion estimation.

The present invention can be embodied in the form of computer-implemented processes and apparatuses for practicing those processes. The present invention can also be embodied in the form of computer program code embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for processing image signals, comprising the steps of:
   (a) loading values representative of eight consecutive reference pixels into a register of eight 8-bit fields using a byte-based first SIMD instruction; and
   (b) applying a second SIMD instruction to the register to transform the values, wherein the second SIMD instruction operates on the register as if the values were a single value, wherein the values are transformed by the steps of:
      (1) subtracting four 16-bit values corresponding to eight consecutive target pixels from four 16-bit values in the register using a word-based SIMD subtraction instruction to generate four 16-bit differences;
      (2) optionally shifting the four 16-bit differences left eight bits to generate four 16-bit shifted differences;
      (3) squaring either the four 16-bit differences or the four 16-bit shifted differences to generate one or more 16-bit squares; and
      (4) summing the 16-bit squares.

2. The method of claim 1, wherein the method is used in motion estimation processing.

3. An apparatus for processing image signals, comprising:
   (a) means for loading values representative of eight consecutive pixels into a register of eight 8-bit fields using a byte-based first SIMD instruction; and
   (b) means for applying a second SIMD instruction to the register to transform the values, wherein the second operation operates on the register as if two or more of the values were a single value, wherein means (b):
      (1) subtracts four 16-bit values corresponding to eight consecutive target pixels from four 16-bit values in the register using a word-based SIMD subtraction instruction to generate four 16-bit differences;
      (2) optionally shifts the four 16-bit differences left eight bits to generate four 16-bit shifted differences;
      (3) squares either the four 16-bit differences or the four 16-bit shifted differences to generate one or more 16-bit squares; and
      (4) sums the 16-bit squares.

4. The apparatus of claim 3, wherein the apparatus is used in motion estimation processing.

5. A storage medium having stored thereon machine-readable program code for processing image signals, wherein, when the program code is executed by a machine, the machine implements the steps of:
   (a) loading values representative of eight consecutive reference pixels into eight 8-bit fields of a register using a byte-based first SIMD instruction; and
   (b) applying a second SIMD instruction to the register to transform the values, wherein the second SIMD instruction operates on the register as if the values were a single value, wherein the values are transformed by the steps of:
      (1) subtracting four 16-bit values corresponding to eight consecutive target pixels from four 16-bit values in the register using a word-based SIMD subtraction instruction to generate four 16-bit differences;
      (2) optionally shifting the four 16-bit differences left eight bits to generate four 16-bit shifted differences;
      (3) squaring either the four 16-bit differences or the four 16-bit shifted differences to generate one or more 16-bit squares; and
      (4) summing the 16-bit squares.

6. The storage medium of claim 5, wherein the storage medium is used in motion estimation processing.

* * * * *